Dec. 6, 1949  T. A. WOOLSEY  2,490,245
DRIVE AND BELT GUARD ASSEMBLY FOR
MOTORIZED BICYCLES AND THE LIKE
Filed July 14, 1948
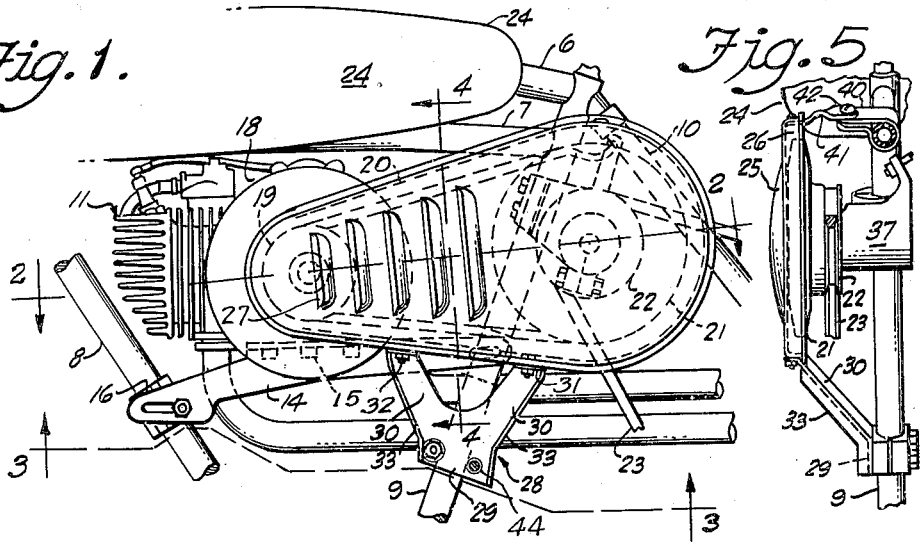
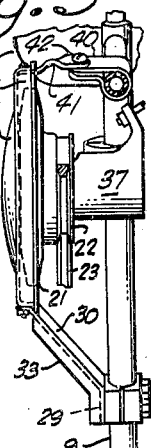
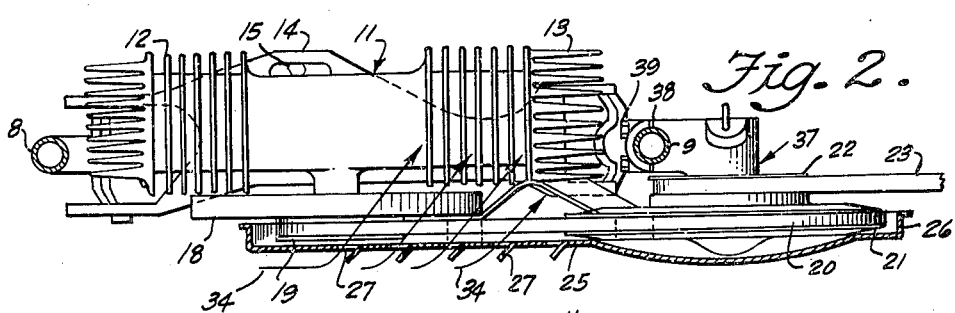
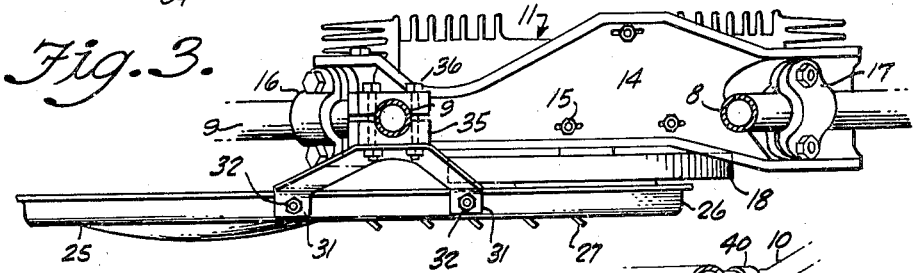
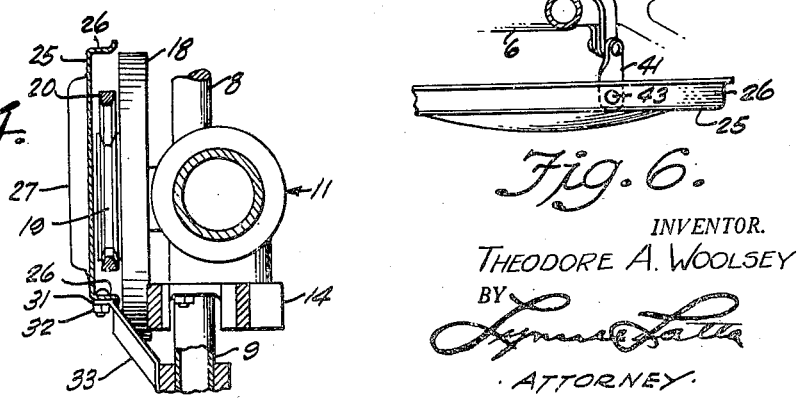
INVENTOR.
THEODORE A. WOOLSEY
BY
ATTORNEY.

Patented Dec. 6, 1949

2,490,245

UNITED STATES PATENT OFFICE 2,490,245

DRIVE AND BELT GUARD ASSEMBLY FOR MOTORIZED BICYCLES AND THE LIKE

Theodore A. Woolsey, Pasadena, Calif., assignor, by mesne assignments, to Jack & Heintz Precision Industries, Inc., Cleveland, Ohio, a corporation of Delaware Application July 14, 1948, Serial No. 38,718

7 Claims. (Cl. 180—33)

This invention relates to motorized bicycles, motorcycles, "scooters" and other motor driven vehicles of a generally similar type, and has as its general object to provide an improved arrangement of motor, drive belt, and belt guard in which the belt guard has the dual function of protecting the rider of the vehicle from contact with the belt and deflecting cooling air upon the motor.

A further object of the invention is to provide a motorized vehicle having an air cooled engine of improved cooling efficiency.

A further object of the invention is to provide an improved arrangement of motorized bicycle frame, motor, drive belt, guard and means for supporting the belt guard on the frame.

A further object of the invention is to provide an improved arrangement in a motorized bicycle or the like, of frame, motor, drive from motor to rear wheel, and drive guard, in which the drive is so disposed as to attain maximum avoidance of interference with the legs of the rider of the vehicle.

Another object is to provide an improved arrangement of drive including a clutch, in which the clutch has a simple mounting to the bicycle frame, which mounting is slidably adjustable on the frame in order to adjust belt tension.

A serious problem that was encountered in the use of a lightweight sheet metal belt guard having louvers, was a large scale cracking of the guards where weakened by the louvers. Another object of the invention is to provide a mounting adapted to support the guard so as to avoid such cracking.

Other objects will become apparent in the ensuing specifications and appended drawings in which:

Fig. 1 is a side view of a portion of a motorized bicycle embodying the invention;

Fig. 2 is a horizontal sectional view of the same taken as indicated by line 2—2 of Fig. 1;

Fig. 3 is a horizontal sectional view, looking upwardly, as indicated by the line 3—3 of Fig. 1;

Fig. 4 is a vertical transverse sectional view taken as indicated by the line 4—4 of Fig. 1;

Fig. 5 is a rear view, partially in section, of the assembly; and

Fig. 6 is a plan view of the upper belt guard support.

As an example of one form in which the invention may be embodied, I have shown in the drawings a motor, drive and belt guard arrangement in a motorized bicycle having a double bar type triangular frame including cross bars 6 and 7, a supporting bar 8 extending diagonally downwardly and rearwardly from the front fork bearing to the crank bearing, an upright bar 9 extending upwardly from the crank bearing to join the rear ends of the horizontal bars 6 and 7, and a rear fork 10 in which the rear wheel is mounted, the fork 10 extending downwardly and rearwardly from the upper end of upright bar 9. A motor 11 having forward and rear cylinder heads 12 and 13 provided with cooling fins as indicated, is mounted upon a motor base 14 by means of bolts 15, and the motor base 14 is in turn mounted on the frame by vibration absorbing couplings 16 and 17. The longitudinal axis of motor 11 is located a little to the right (looking forwardly) of the vertical plane of the frame members 8 and 9, being substantially balanced by a flywheel 18 located to the left of the said plane. The flywheel 18 carries a drive pulley 19. A belt 20 travels on the pulley 19 and on a larger pulley 21 which forms a part of a clutch 37. The clutch 37 functions to establish and release a drive connection between pulley 20 and a smaller pulley 22 from which a belt 23 carries the drive to the rear wheel.

The clutch 37 is mounted on the upright bar 9 by means of a two-part clamp 38 secured by screws 39 which may be loosened to allow the clutch to be adjusted vertically on the bar 9, so as to adjust the tension in the belt 23.

The belt 20 and pulleys 19 and 21 are embraced by a combined belt guard and air deflector comprising the generally flat sheet metal body member 25 having a peripheral flange 26 and having louvers 27 in its forward half. The belt guard is supported by a bracket 28 of Y-shape comprising a shank portion 29 and arms 30 diverging upwardly therefrom, the upper ends of the arms 30 being bent at substantially right angles to the plane of the shank portion 29 to form tabs 31 which are perforated and secured to the lower reach of flange 26 by means of bolts 32. Reinforcing flanges 33 extend along the side margins of the arms 30 and shank 29. The shank portion 29 of the bracket 28 is secured against the outer face of the outer one of a pair of clamping blocks 35, a pair of bolts 36 being extended through the respective ends of the blocks 35 and through openings 44 in the shank member 29 and securing the clamp blocks and the bracket in assembly on the vertical frame bar 9. The openings 44 are larger in diameter than the bolts 36, so that the bracket may be pivoted about a transverse axis between the bolts, thereby to tilt the guard to the proper inclination of its longitudinal axis. Bodily adjustment of the guard for height is provided for by sliding the bracket 28 on the frame bar 9. Such adjustments permit the apparatus to be applied to bicycles of varying frame configuration.

The upper side of the belt guard is attached to the fork 10 by means of a clip 40 which embraces the fork 10, and a link 41 which is attached at one end to the clip 40 by a bolt 42 and at its other end is secured to the inner side of the flange 26, as by a rivet 43.

I find that by thus supporting the guard from above and below, with the lower support distributed at points approximately 1/3 and 2/3 respectively of the distance from one end of the guard to the other, and with the guard isolated from the motor and its base, that the problem of cracking of the guards at the louvers is fully solved.

The arms 33, as indicated in Fig. 5, are inclined upwardly and outwardly from shank portion 29. The inclination is sufficient to offset the belt guard outwardly from the plane of the frame bars 8 and 9 sufficiently to clear the pulleys 19 and 21. A sectional fuel tank 24, supported on bars 6 and 7, has its outer left face disposed substantially in the outer plane of the belt guard so as to substantially prevent inward pressure being exerted against the belt guard by the left leg of the rider, the tank 24 spacing the leg sufficiently outwardly to substantially clear the belt guard. Consequently, it is possible to support the belt guard only by the two brackets described above.

The axis of pulleys 21 and 22 is located on a level with or slightly above the axis of the flywheel 18, with the drive mechanism located fairly closely to the seat and being generally disposed as high as is permitted by requirements for proper clearance below the seat and the gasoline tank 24. Because of the location of the belt guard and drive mechanism 19, 20, 21, 22 at maximum height, there is maximum space below the belt guard for the left foot of the operator to rest comfortably upon the left pedal of the bicycle. Such arrangement also disposes the clutch in a preferable location, and makes it possible to attain the simple arrangement for belt tightening referred to above.

In the operation of the bicycle, air will be deflected by the louvers 27 inwardly against the rear cylinder head 13 as indicated by arrows 34. The forward cylinder head 12 being exposed to the full force of air moving rearwardly relative to the bicycle, does not require the lateral deflection of air as does the rear cylinder head.

It will be apparent to those skilled in the art that various changes and modifications may be made in the construction and arrangement of parts without departing from the spirit of the invention and it is intended that all such changes and modifications shall be embraced within the scope of the following claims.

I claim:

1. In a motorized bicycle, a frame including a pair of upwardly diverging frame bars connected at their upper ends by one or more horizontal frame bars, a motor disposed in the upper region of the space defined between said frame bars, said motor having a flywheel and a drive pulley, a driven pulley, journalled on said frame on an axis roughly level with the axis of said drive pulley and somewhat rearwardly of said rear upright bar, and a belt traveling over said pulley, a belt guard lying outwardly of said belt and pulleys and adjacent thereto, said belt guard having a peripheral flange embracing said belt, and means for supporting said belt guard with a substantial portion thereof projecting rearwardly of said rear upright bar and a portion thereof projecting forwardly of said upright bar, said means consisting in a single Y-shaped bracket having a shank portion and a pair of arms diverging upwardly therefrom and inclined upwardly and outwardly from the plane of said frame bars, the upper ends of said arm being bent outwardly to provide tabs which are secured to the under side of the under stretch of said flange, and means attaching said shank portion to the rear one of said upright bars, said attaching means comprising a pair of clamp blocks embracing said rear upright bar and a pair of bolts extending through said clamp blocks and through said shank portion and clamping said blocks upon said rear upright bar and securing said shank portion to the outer face of the outer clamp block.

2. In a motorized bicycle, a frame including a pair of frame bars diverging upwardly and connected by one or more horizontal bars at their upper ends, a motor having two aligned cylinder heads with air cooling fins thereon, disposed in the upper region of the space defined between said frame bars, the longitudinal axis of said motor being located at one side of the vertical plane of said frame bars, said motor having a flywheel located at the other side of said plane, a drive pulley carried by said flywheel outwardly thereof, a driven pulley mounted on said frame on an axis just rearwardly of the rear frame bar, and substantially on a level with the axis of said flywheel, a belt trained about said pulleys, a belt guard disposed outwardly of said belt and pulleys and adjacent thereto, said belt guard having in the forward portion thereof a number of louvers inclined outwardly and forwardly and adapted to scoop up air during forward motion of the bicycle and to deflect it inwardly against the rear cylinder head, said forward cylinder head being exposed to direct impact of air thereagainst during such forward movement, a bracket for supporting said belt guard, said bracket including a shank portion attached to the rear frame bar and another portion inclined upwardly and outwardly and secured to the lower extremity of said belt guard, said belt guard having a peripheral flange embracing said belt, a pair of clamp blocks embracing the rear frame bar between them, and a pair of bolts extending through said clamp blocks and through said shank portion and clamping the latter against the outer face of the outer clamp block, said bracket including a third portion inclined upwardly and outwardly and terminating in a substantially horizontal tab secured to the lower stretch of said flange.

3. In a motorized bicycle, a frame including a pair of frame bars diverging upwardly and connected by one or more horizontal bars at their upper ends, a motor having two aligned cylinder heads with air cooling fins thereon, disposed in the upper region of the space defined between said frame bars, the longitudinal axis of said motor being located at one side of the vertical plane of said frame bars, said motor having a flywheel located at the other side of said plane, a drive pulley carried by said flywheel outwardly thereof, a driven pulley mounted on said frame on an axis just rearwardly of the rear frame bar, and substantially on a level with the axis of said flywheel, a belt trained about said pulleys, a belt guard disposed outwardly of said belt and pulleys and adjacent thereto, said belt guard having in the forward portion thereof a number of louvers inclined outwardly and forwardly and adapted to scoop up air during forward motion of the bicycle and to deflect it inwardly against the rear cylinder head, said forward cylinder head being exposed to direct impact of air thereagainst during such forward movement, and a bracket for supporting said belt guard, said bracket including a portion attached to the rear frame bar and another portion inclined upwardly and outwardly and secured to the lower extremity of said belt guard.

4. In a motorized bicycle, a frame including a pair of frame bars diverging upwardly and connected by one or more horizontal bars at their upper ends, a motor having two aligned cylinder heads with air cooling fins thereon, disposed in the upper region of the space defined between said frame bars, the longitudinal axis of said motor being located at one side of the vertical plane of said frame bars, said motor having a flywheel located at the other side of said plane, a drive pulley carried by said flywheel outwardly thereof, a driven pulley mounted on said frame on an axis just rearwardly of the rear frame bar, and substantially on a level with the axis of said flywheel, a belt trained about said pulleys, and a belt guard disposed outwardly of said belt and pulleys and adjacent thereto, said belt guard having in the forward portion thereof a number of louvers inclined outwardly and forwardly and adapted to scoop up air during forward motion of the bicycle and to deflect it inwardly against the rear cylinder head, said forward cylinder head being exposed to direct impact of air thereagainst during such forward movement.

5. In a motorized bicycle, in combination with a frame including a pair of upwardly diverging frame bars, a motor supported between said bars and having forward and rear cylinder heads provided with cooling fins, a drive belt extending rearwardly from one side of said motor to transmit drive toward the rear wheel of the bicycle, and a belt guard disposed adjacent the outer side of said drive belt, said belt guard having a plurality of louvers extending forwardly and outwardly and adapted to scoop up air during forward motion of the bicycle and to deflect said air inwardly against the rear cylinder head of said motor.

6. For a motorized bicycle comprising a frame including a pair of upwardly diverging frame bars connected at their upper ends by one or more horizontal frame bars, a motor disposed in the upper region of the space defined between said frame bars, said motor having a flywheel and a drive pulley, a driven pulley, journalled on said frame on an axis roughly level with the axis of said drive pulley and somewhat rearwardly of said rear upright bar, and a belt traveling over said pulleys: a belt guard lying outwardly of said belt and pulleys and adjacent thereto, said belt guard having a peripheral flange adapted to embrace said belt, and means for supporting said belt guard with a substantial portion thereof projecting rearwardly of said rear upright bar and a portion thereof projecting forwardly of said upright bar, said means consisting in a single Y-shaped bracket having a shank portion and a pair of arms diverging upwardly therefrom and inclined upwardly and outwardly from the plane of said frame bars, the upper ends of said arm being bent outwardly to provide tabs which are secured to the under side of the under stretch of said flange, and means attaching said shank portion to the rear frame bar.

7. A belt guard as defined in claim 6, wherein said belt guard has in its forward portion a plurality of louvers inclined outwardly and forwardly and adapted to scoop up air during forward motion of the bicycle and to deflect it inwardly against the rear portion of said engine.

THEODORE A. WOOLSEY.

REFERENCES CITED

The following references are of record in the file of this patent:

UNITED STATES PATENTS

| Number | Name | Date |
| --- | --- | --- |
| 1,308,022 | Christiansen | July 1, 1919 |

FOREIGN PATENTS

| Number | Country | Date |
| --- | --- | --- |
| 169,549 | Great Britain | Oct. 6, 1921 |